(12) United States Patent
Lee

(10) Patent No.: US 7,821,591 B2
(45) Date of Patent: Oct. 26, 2010

(54) SEPARATION TYPE CHASSIS AND FLAT PANEL DISPLAY HAVING THE SAME

(75) Inventor: Young Jae Lee, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 209 days.

(21) Appl. No.: 11/753,322

(22) Filed: May 24, 2007

(65) Prior Publication Data

US 2007/0273809 A1 Nov. 29, 2007

(30) Foreign Application Priority Data

May 26, 2006 (KR) ...................... 10-2006-0047649

(51) Int. Cl.
*G02F 1/1333* (2006.01)
*F16B 7/00* (2006.01)
(52) U.S. Cl. ........................... 349/58; 349/60; 403/286; 403/293; 403/341
(58) Field of Classification Search ................. 403/293, 403/306, 286, 341; 349/58, 60
See application file for complete search history.

(56) References Cited

U.S. PATENT DOCUMENTS 6,175,396 B1 * 1/2001 Kim et al. ...................... 349/58
6,648,541 B1 * 11/2003 Muller et al. ............... 403/286

FOREIGN PATENT DOCUMENTS

| JP | 8082788 | 3/1996 |
|----|---------|--------|
| JP | 2000039850 | 2/2000 |
| JP | 2002023648 | 1/2002 |
| JP | 2003050549 | 2/2003 |
| JP | 2005107498 | 4/2005 |
| KR | 1020040105475 | 12/2004 |
| KR | 1020050058733 | 6/2005 |
| KR | 1020050064378 | 6/2005 |
| KR | 1020050072557 | 7/2005 |

\* cited by examiner

*Primary Examiner*—Jerry T Rahll
(74) *Attorney, Agent, or Firm*—Cantor Colburn LLP

(57) ABSTRACT

A separation type chassis for a flat panel display includes at least two chassis members, and a plurality of fastening members for coupling the chassis members, and coupling holes having a predetermined shape are formed at both ends of each of the chassis members. Each of the fastening members is coupled with the coupling holes.

11 Claims, 20 Drawing Sheets

SEPARATION TYPE CHASSIS AND FLAT PANEL DISPLAY HAVING THE SAME

This application claims priority to Korean Patent application No. 10-2006-0047649, filed on May 26, 2006, and all the benefits accruing therefrom under 35 U.S.C. §119, the contents of which in its entirety are herein incorporated by reference.

BACKGROUND OF THE INVENTION

1. Field of the Invention

The present invention relates to a separation type chassis and a flat panel display having the same, and more particularly, to a separation type chassis and a flat panel display having the same, wherein production costs are reduced and convenience of assembly is improved.

2. Description of the Related Art

In general, a liquid crystal display comprises a liquid crystal display panel on which images are displayed, a driving unit for driving the liquid crystal display panel, a backlight unit for providing light to the liquid crystal display panel, and a chassis for combining these components into one body. The chassis comprises a lower chassis for providing a predetermined receiving space, and an upper chassis coupled to the lower chassis. The upper chassis constituting the chassis will be described in detail below. Other types of flat panel displays include plasma displays, organic light emitting diode displays ("OLED" displays), among others.

Referring to FIG. 1 is an elevated front perspective view of an integral, or single piece, type chassis according to the prior art, and FIGS. 2A and 2B are an exploded perspective view and a partially enlarged view of a separation type chassis according to the prior art.

FIG. 1 shows the integral type chassis 10 formed in the shape of a rectangular frame with an open region corresponding to a display area of the liquid crystal display panel. The integral type chassis is manufactured in the form of a rectangular frame by pressing a metal sheet. Thus, a piece of the metal sheet which corresponds to the open region of the integral type chassis is punched out and is separated from the rest of the metal rectangular frame. This punched out section cannot be reused, resulting in increased material costs. Further, as the size of the liquid crystal display is increased, the size of the integral type chassis is also increased and thus there is difficulty in storing and transporting the integral type chassis.

Referring to FIGS. 2A and 2B, the separation type chassis 20 comprises four chassis members 21, 22, 23 and 24. The separation type chassis is assembled in the form of a rectangular frame by overlapping opposite ends of the respective chassis members with one another and pressing the ends using a press so as to fix them together. However, the pressing process using the press is complicated and the required press is expensive. Thus, there is a problem of more increased production costs. Although there is a recent tendency for the width of a chassis to be decreased, there is technical difficulty in manufacturing such a chassis with a small width through the pressing process using the press. Accordingly, there is a problem in that the pressing process cannot be applied to a chassis with a small width.

BRIEF SUMMARY OF THE INVENTION

The present invention is conceived to solve the aforementioned problems. An object of the present invention is to provide a separation type chassis and a flat panel display having the same, wherein production costs are reduced and convenience of assembly is improved.

According to an exemplary embodiment of the present invention, a separation type chassis for a flat panel display includes; at least two chassis members; and a plurality of fastening members coupling the chassis members, wherein coupling holes having a predetermined shape are formed at opposing ends of each of the chassis members, and each of the fastening members is coupled with the coupling holes.

The plurality of fastening members may comprise first and second fastening members, wherein the first fastening members includes a protrusion having a predetermined shape to be inserted into the coupling hole and the second fastening member includes a fixing means fixing the first fastening member to the chassis member.

Each of the chassis members may include a base surface and a sidewall extending substantially vertically from the base surface.

The coupling holes may be formed in one of the base surface and sidewall of each of the chassis members.

The coupling holes may be formed in the base surface and sidewall of each of the chassis members.

Each of the chassis members may be made of a metallic or plastic material.

The chassis members may comprise first to fourth chassis members each of which is formed having a major longitudinal axis and a smaller lateral axis.

The chassis members may comprise first and second "L-shaped" chassis members.

The chassis members may include first and second "U-shaped" chassis members.

Opposing ends of each of the chassis members may be formed with guide recesses guiding the positioning of the fastening members, and the coupling holes may be formed in the guide recesses.

The first fastening member may include a base plate and protrusions formed on the base plate, and the second fastening member may comprise a base plate and holes formed in the base plate to be coupled to the protrusion of the first fastening member.

The number of the protrusions on the first fastening member is double the number of coupling holes formed on one end of the chassis members and the shape of the protrusions of the first fastening member correspond to the shape of the coupling holes formed on one end of each of the chassis members.

An end of the protrusion distal from the base plate may have a size larger than that of a body portion thereof.

The size of an entrance portion of the hole of the second fastening member may be smaller than that of an inner portion of the hole.

The first and second fastening members may be disposed on opposing surfaces of one of the base surface and sidewall of each of the chassis members, respectively.

The first and second fastening members are disposed on opposing surfaces of each of the base surface and the sidewall of each of the chassis members, respectively.

The first and second fastening members may be made of a metallic or plastic material.

The entrance portion of the hole of the second fastening member may be formed to protrude from the base plate of the second fastening member by a predetermined height.

Each of the fastening members may have a protrusion inserted into and fastened to the coupling hole.

According to another exemplary embodiment of the present invention, a flat panel display includes; a flat display panel, a mold frame having a predetermined receiving space receiving the flat display panel, and a separation type chassis partially covering a top surface of the flat display panel, wherein the separation type chassis comprises at least two chassis members and a plurality of fastening members coupling the chassis members, coupling holes having a predetermined shape are formed at opposing ends of each of the chassis members, and each of the fastening members is coupled with the coupling holes.

BRIEF DESCRIPTION OF THE DRAWINGS

The above and other aspects, features and advantages of the present invention will become more apparent from the following description of exemplary embodiments given in conjunction with the accompanying drawings, in which.

DETAILED DESCRIPTION OF THE INVENTION

Figure 1:
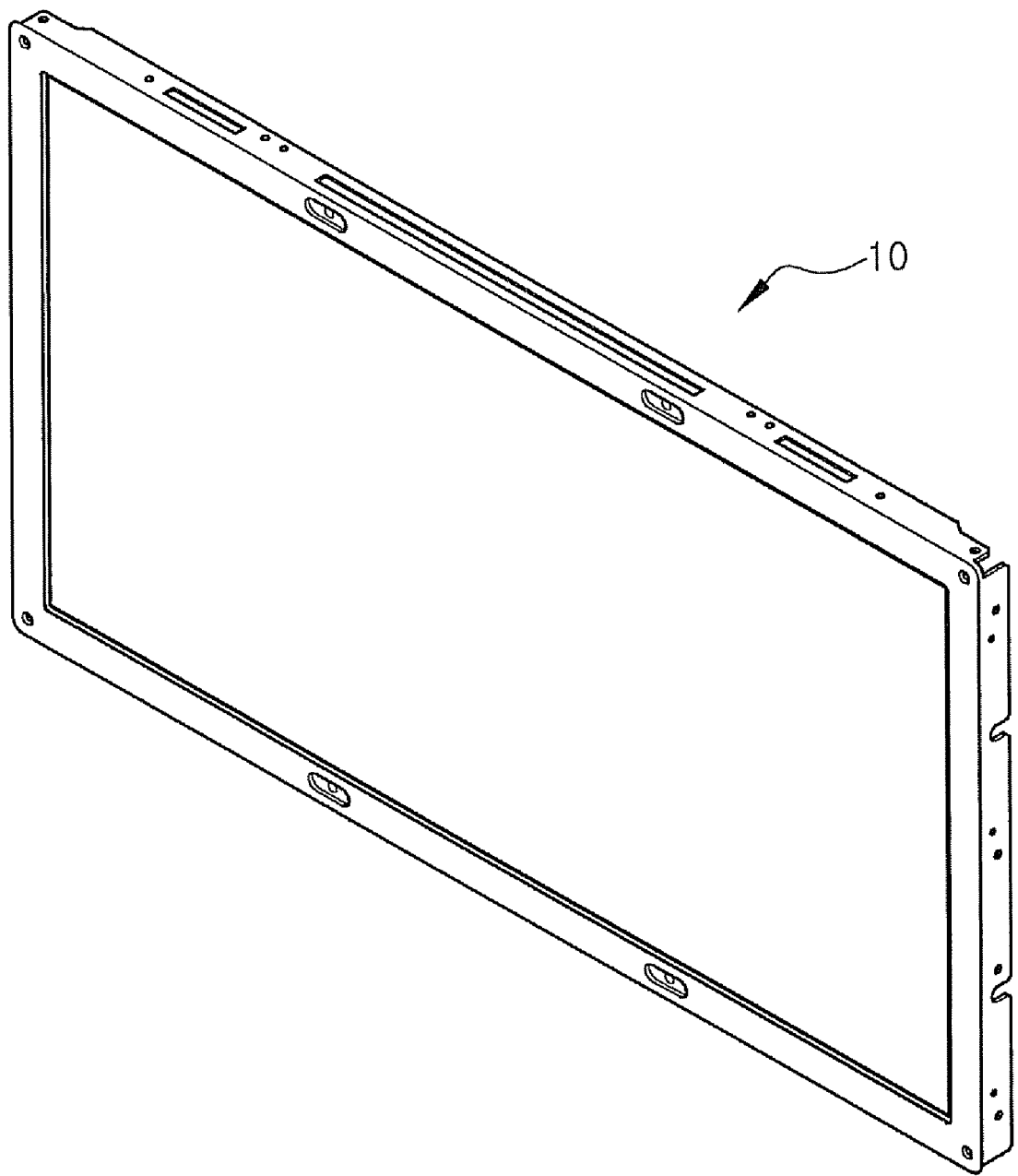
FIG. 1 is an elevated front perspective view of an integral type chassis according to the prior art.
Figure 2A:
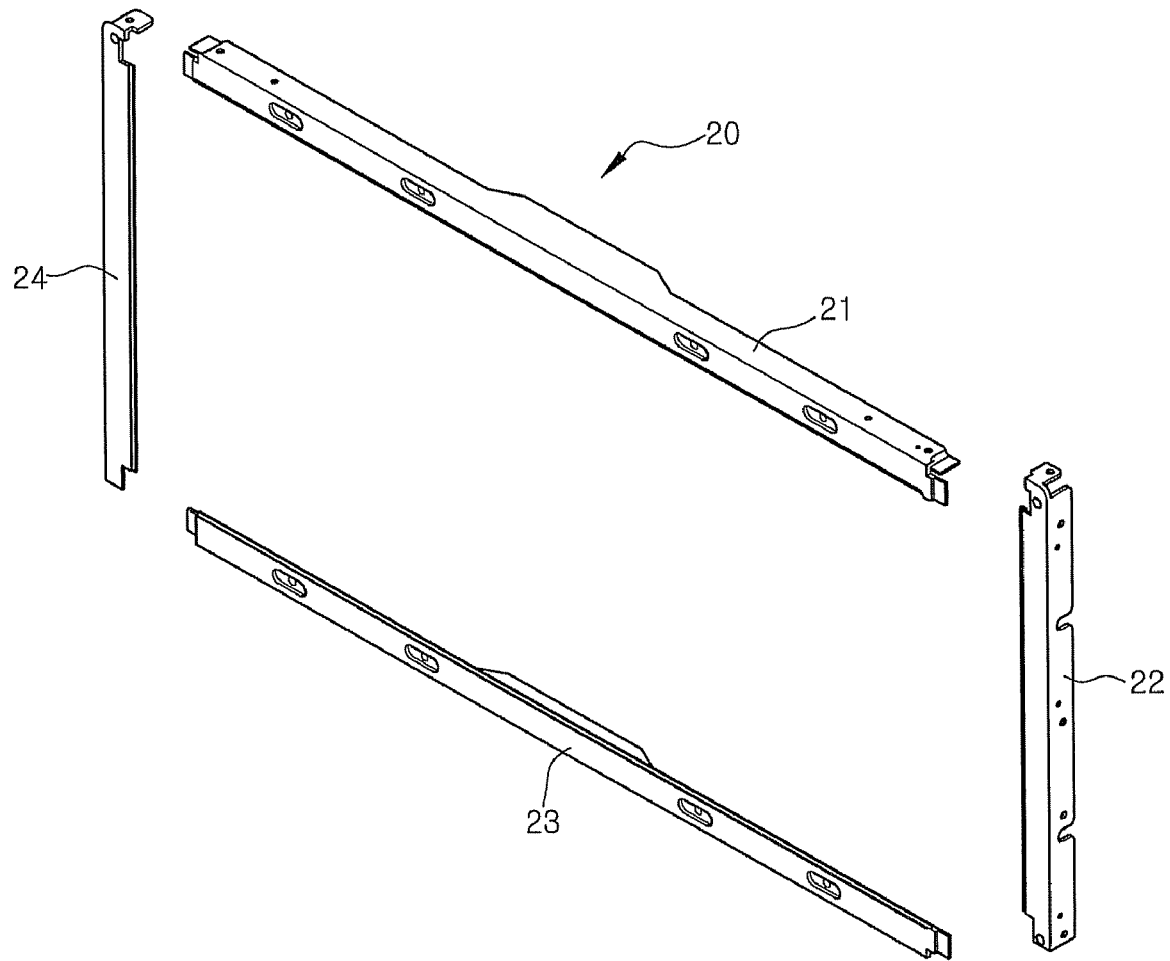
FIGS. 2A and 2B are an exploded perspective view and a partially enlarged view of a separation type chassis according to the prior art, respectively.
Figure 2B:
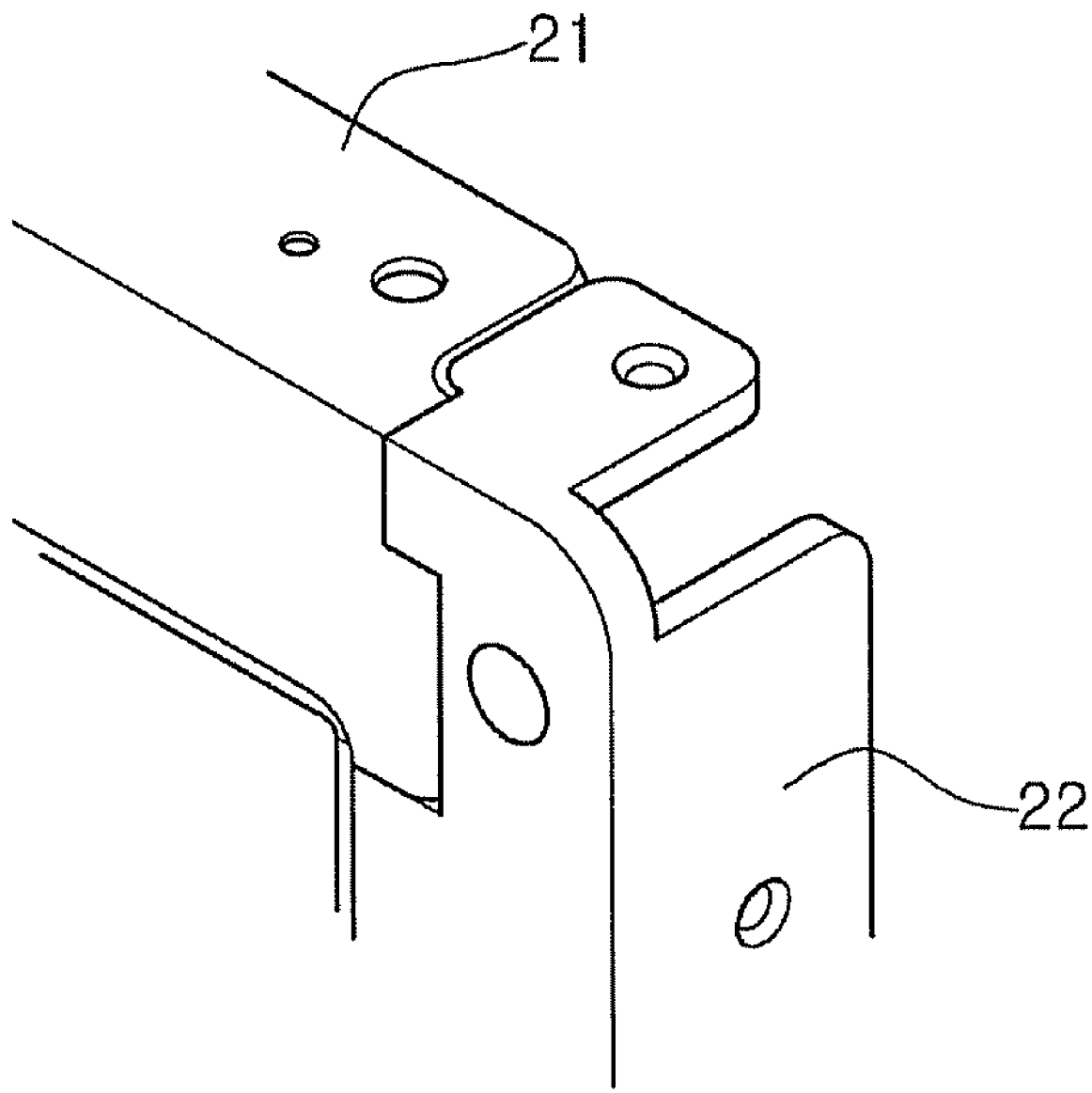

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 3A:
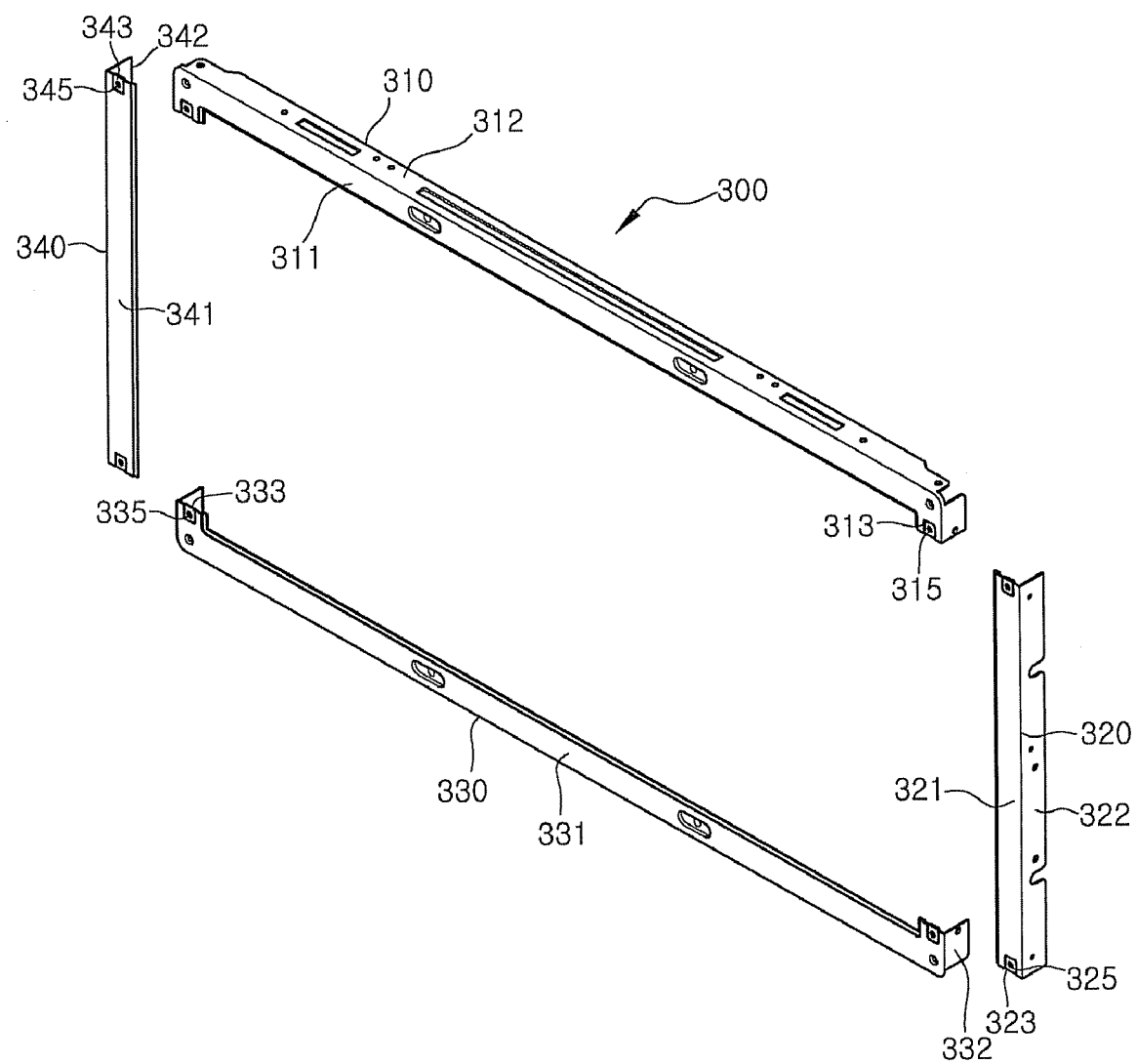
FIGS. 3A and 3B are an exploded perspective view and a partially enlarged view of an exemplary embodiment of a separation type chassis according to the present invention, respectively.
Figure 3B:
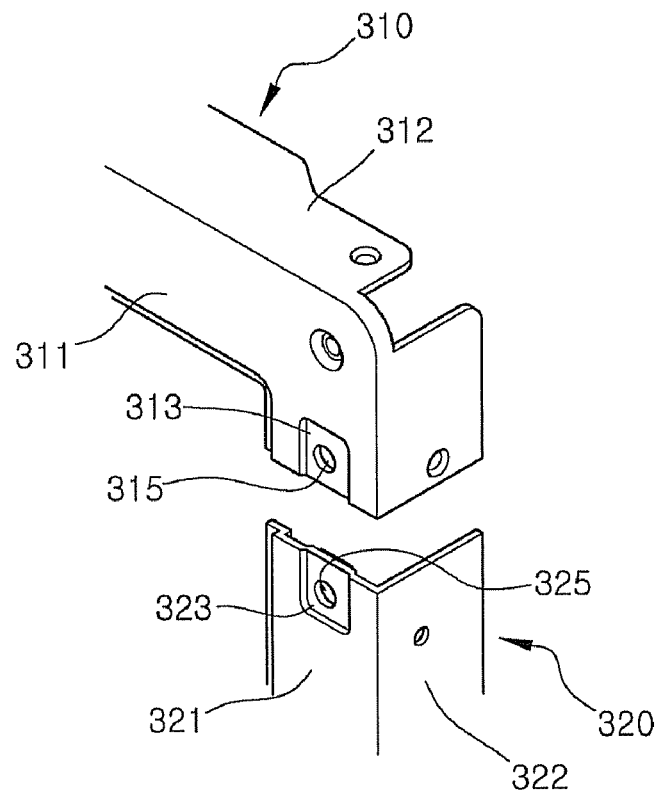
Figure 3C:
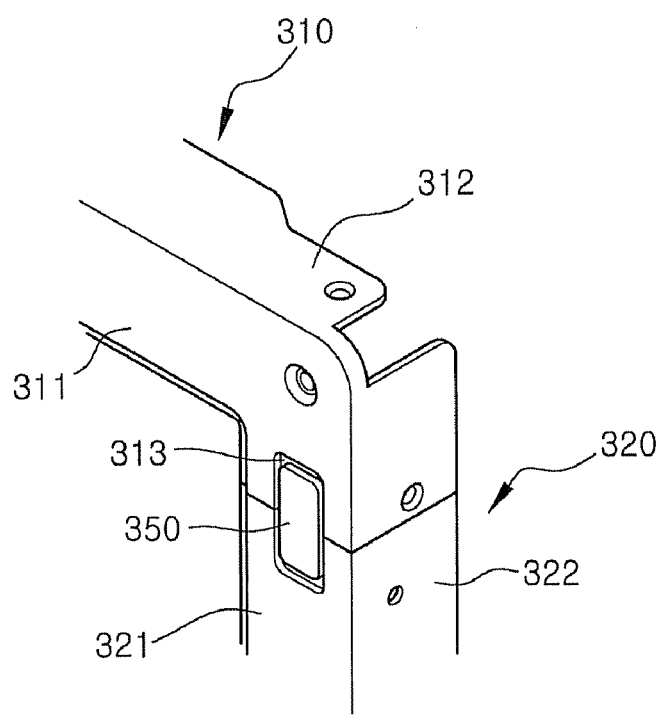
FIGS. 3C and 3D are partially enlarged views showing an assembled state of an exemplary embodiment of the separation type chassis.
Figure 3D:
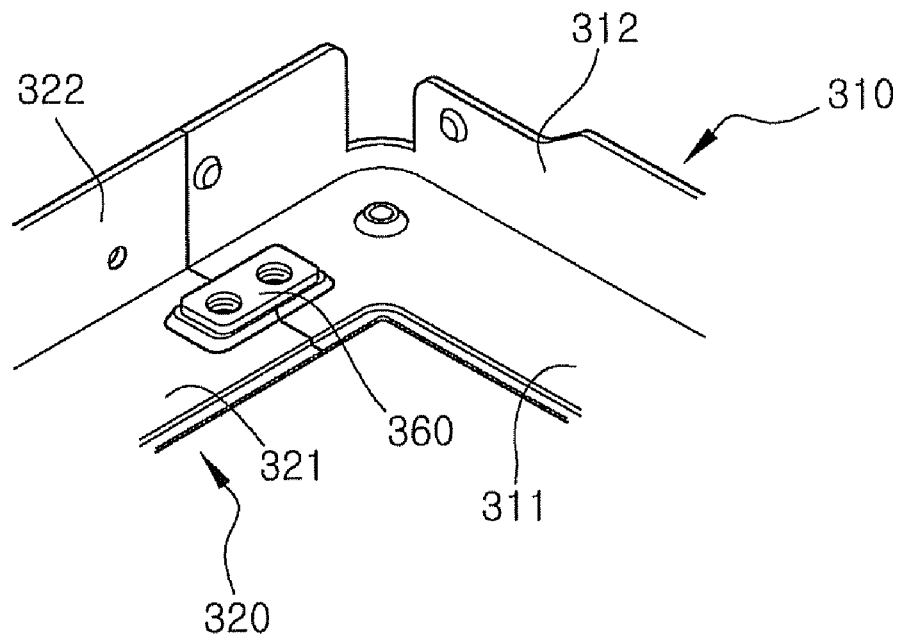
Figure 4A:
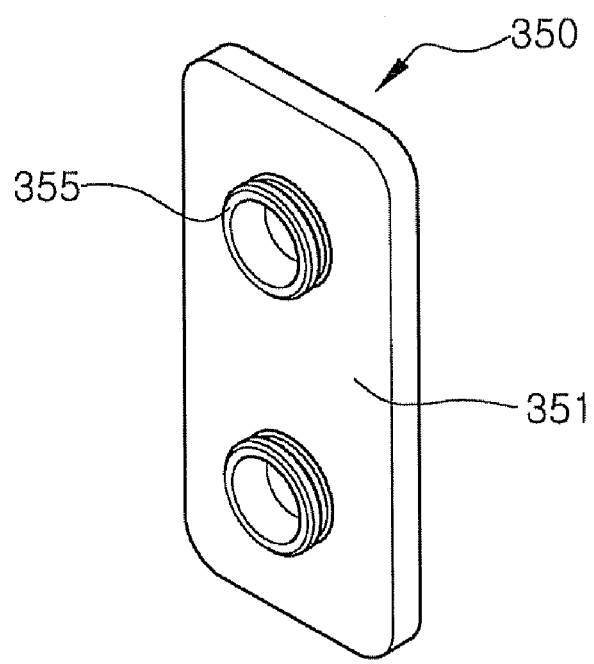
FIGS. 4A, 4B, 4C and 4D are an elevated front perspective view, a top plan view, a front view and a side view showing a first exemplary embodiment of a first fastening member of the separation type chassis according to the present invention, respectively.
Figure 4B:
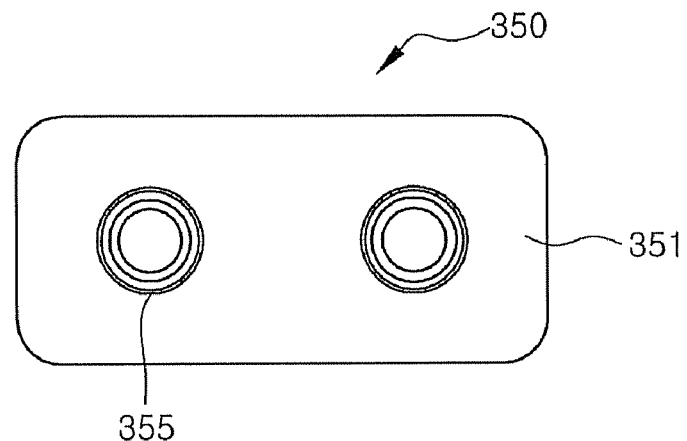
Figure 4C:
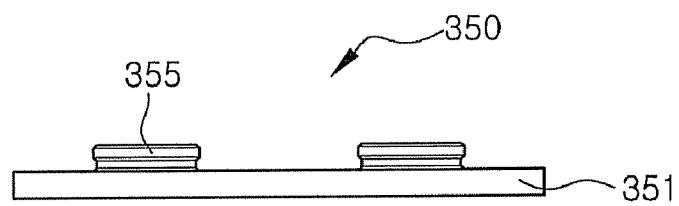
Figure 4D:
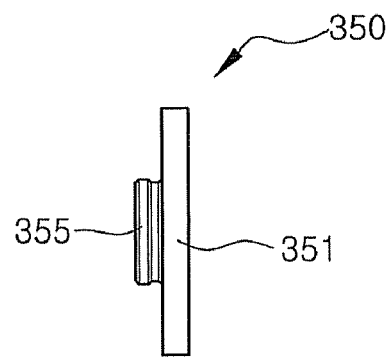

FIGS. 3A and 3B are an exploded perspective view and a partially enlarged view of an exemplary embodiment of a separation type chassis according to the present invention, respectively; and FIGS. 3C and 3D are partially enlarged views showing an assembled state of an exemplary embodiment of the separation type chassis. The separation type chassis 300 shown in FIGS. 3A to 3D comprises chassis members including first to fourth chassis members 310 to 340, and fastening members including first and second fastening members 350 and 360.

Referring to FIGS. 3A and 3B, the chassis members include the first chassis member 310, the second chassis member 320, the third chassis member 330 and the fourth chassis member 340, each of which is formed to have a major longitudinal axis and a smaller lateral axis. Each of the chassis members has a base surface and a sidewall extending vertically from the base surface, so that the chassis member has an "L"-shaped cross-section. Further, the first and third chassis members 310 and 330 have a longer longitudinal axis (length) than the longitudinal axis of the second and fourth chassis members 320 and 340.

That is, the first chassis member 310 comprises a first base surface 311 and a first sidewall 312 extending substantially vertically from the first base surface 311; the second chassis member 320 comprises a second base surface 321 and a second sidewall 322 extending substantially vertically from the second base surface 321; the third chassis member 330 comprises a third base surface 331 and a third sidewall 332 extending substantially vertically from the third base surface 331; and the fourth chassis member 340 comprises a fourth base surface 341 and a fourth sidewall 342 extending substantially vertically from the fourth base surface 341.

The underside of the above-described base surfaces are placed on an upper surface of a flat panel display, and the sidewalls surround side surfaces of the flat panel display.

Exemplary embodiments of the chassis members can be made of a metallic or plastic material. If the chassis members are made of a metallic material, they may be formed, according to one exemplary embodiment, through a pressing process. If the chassis members are made of a plastic material, they may be formed, according to one exemplary embodiment, through a molding process.

Further, both ends of each chassis member are formed with guide recesses having a predetermined shape to guide the positioning of the fastening members, which will be described later, and coupling holes having a predetermined shape are formed in the guide recesses.

That is, the guide recesses 313 having a predetermined shape are formed at opposing ends of the first chassis member 310, and the coupling holes 315 having a predetermined shape are formed in floor surfaces of the guide recesses 313. Further, the guide recesses 323, 333 and 343 having a predetermined shape are formed at opposing ends of the second to fourth chassis members 320, 330 and 340, respectively, and the coupling holes 325, 335 and 345 having a predetermined shape and penetrating through the chassis members are formed in floor surfaces of the guide recesses 323, 333 and 343, respectively.

The guide recesses 313, 323, 333 and 343 are formed such that the recessed floor surfaces of the guide recesses are recessed into the base surfaces of the chassis members. In one exemplary embodiment the floor surfaces of the guide recesses 313, 323, 333 and 324 are positioned lower than the base surfaces of the chassis members by an amount equal to the thickness of a first fastening member which will be described later. Exemplary embodiments of the guide recesses can be formed through a pressing process or a molding process. That is, the guide recesses are formed by being concavely depressed with respect to the base surfaces of the chassis members. Although the guide recesses are formed to have a rectangular shape in the exemplary embodiment illustrated in FIGS. 3A-3D, the shape of the guide recesses is not limited thereto but may be variously modified. According to one exemplary embodiment the guide recesses are formed to have a shape corresponding to the shape of the fastening member. Although the guide recesses and the coupling holes are formed in the base surfaces of the chassis members in this exemplary embodiment, the present invention is not limited thereto.

Although the guide recesses for guiding the fastening members are formed in this exemplary embodiment, the present invention is not limited thereto. Alternative exemplary embodiments include configurations where the coupling holes may be formed without the formation of the guide recesses.

FIGS. 3C and 3D are a partially enlarged top perspective view and a partially enlarged bottom perspective view showing an assembled state of an exemplary embodiment of the separation type chassis where an end of the first chassis member 310 is coupled to an end of the second chassis member 320 by means of the fastening member, respectively. In the first exemplary embodiment of a separation type chassis according to the present invention, corresponding ends of the first to fourth chassis members 310 to 340 are coupled to each other through a plurality of fastening members. However, for the sale of convenience of description and because the coupling structures are substantially similar for each of the chassis members, only a coupling structure of the corresponding ends of the first and second chassis members 310 and 320 will be described below.

A process of assembling the separation type chassis will be described with reference to FIGS. 3C and 3D. First, the corresponding ends of the first and second chassis members 310 and 320 are disposed to be in contact with each other. Next, a first fastening member 350 having protrusions with a predetermined shape matching the coupling hole 315 of the first chassis member 310 and the coupling hole 325 of the second chassis member 320 is disposed on the outer surfaces of the first and second chassis members. Thereafter, a second fastening member 360 having fixing means for fixing the first fastening member 350 to the first and second chassis members is disposed on inner surfaces, opposite the base surfaces, of the first and second chassis members. Then, the protrusions of the first fastening member 350 are coupled to the fixing means of the second fastening member 360, thereby coupling the first and second chassis members 310 and 320 to each other. The remaining chassis members may be coupled to one another in a substantially similar manner, thereby forming a chassis in the form of a rectangular frame.

The structures of the first and second fastening members 350 and 360, and the fastening structures formed by the first and second fastening members 350 and 360 will be described in greater detail with reference to the drawings.

FIGS. 4A, 4B, 4C and 4D are an elevated front perspective view, a top plan view, a front view and a side view showing a first exemplary embodiment of a first fastening member of the separation type chassis according to the present invention, respectively.

Referring to FIGS. 4A to 4D, the first fastening member 350 comprises a base plate 351 and protrusions 355 formed on the base plate. In this exemplary embodiment, the base plate 351 has a rectangular shape, and there are two protrusions 355 having a cylindrical shape. One of the two protrusions is inserted into the coupling hole 315 formed in the first chassis member 310, and the other is inserted into the coupling hole 325 formed in the second chassis member 320. As shown in the FIGS. 3D and 4A-4D, the protrusions 355 may be formed to take the shape of a hollow cylinder. However, alternative exemplary embodiments include configurations where the shape of the protrusions 355 may be a solid cylinder. Further, according to the exemplary embodiment shown in FIGS. 4A-4D n end portion of the protrusion 355 distal from the base plate 351 has a diameter larger than that of a body portion thereof so as to form a stepped structure. Moreover, exemplary embodiments of the first fastening member 350 may be made of a metallic or plastic material.

Although this embodiment has been described in connection with the base plate 351 formed to have a rectangular shape and the protrusions 355 formed to have a cylindrical shape, the shapes of the base plate 351 and the protrusions 355 are not limited thereto but may be modified variously. The number of the protrusions 355 may be changed to correspond to the number of coupling holes, which in turn may be increased as will be described below.

FIGS. 5A, 5B, 5C and 5D are an elevated front perspective view, a top plan view, a front view and a side view showing the second exemplary embodiment of a fastening member of the first exemplary embodiment of a separation type chassis according to the present invention, respectively.

Referring to FIGS. 5A to 5D, the second fastening member 360 comprises a base plate 361, and holes 365 having a predetermined shape formed in the base plate so as to be coupled to the protrusions 355. In this exemplary embodiment, the base plate 361 is formed to have a rectangular shape, and two holes 365 are formed to have a circular shape corresponding to the protrusions 355. At this time, one of the two holes is coupled to one of the protrusions 355 of the first fastening member 350, and the other hole is coupled to the remaining protrusion.

Figure 5A:
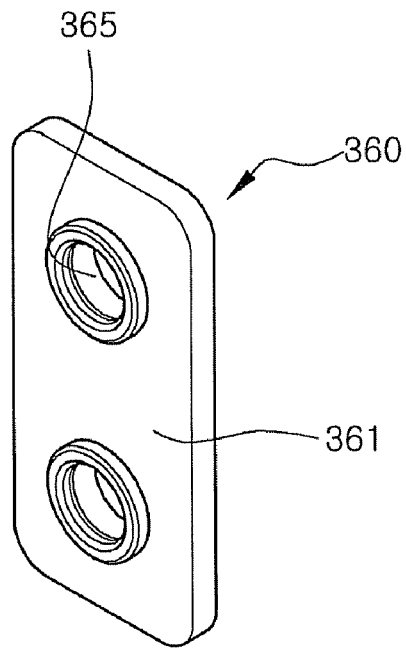
FIGS. 5A, 5B, 5C and 5D are an elevated front perspective view, a top plan view, a front view and a side view showing a second exemplary embodiment of a fastening member of the first exemplary embodiment of a separation type chassis according to the present invention, respectively.
Figure 5B:
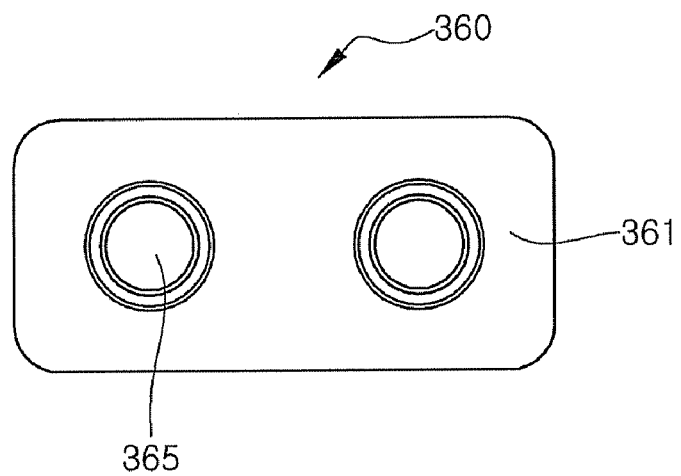
Figure 5C:
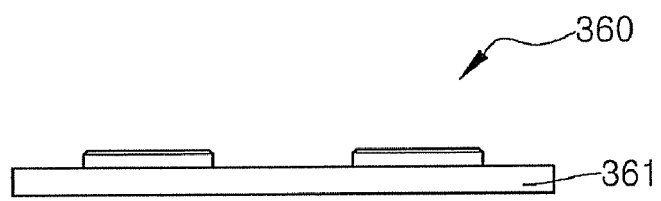
Figure 5D:
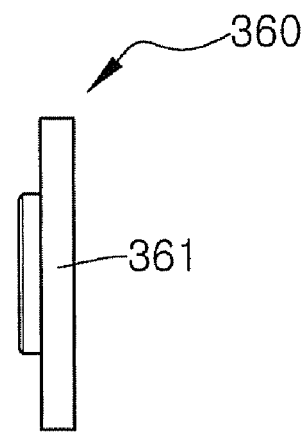

The diameter of an entrance portion of the hole 365 formed in the base plate 361 is smaller than that of an inner portion of the hole. As shown in FIGS. 5A and 5B, the entrance portion of the hole 365 protrudes from the base plate 361 by a predetermined height. However, in alternative exemplary embodiments the shape of the hole may be formed such that the entrance portion of the hole 365 is flush with the base plate in height. Exemplary embodiments of the second fastening member 360 may also be made of a metallic or plastic material.

Although this exemplary embodiment has been described in connection with the base plate 361 formed to have a rectangular shape and the holes 365 formed to have a cylindrical shape, the shapes of the base plate 361 and the protrusions 365 are not limited thereto and may be modified variously depending on the shape of the protrusions 355. The number of the holes 365 may be changed to correspond to that of the protrusions.

Alternative exemplary embodiments include configurations where the protrusions are formed with a tip portion having an arrowhead or cone shape so that the protrusion may be easily inserted into the hole but cannot be easily withdrawn. Furthermore, a space may be secured within the protrusion to provide certain tension. (Since the shape of the protrusion is important, it is not necessary to disclose the width of the space.)

Figure 6A:
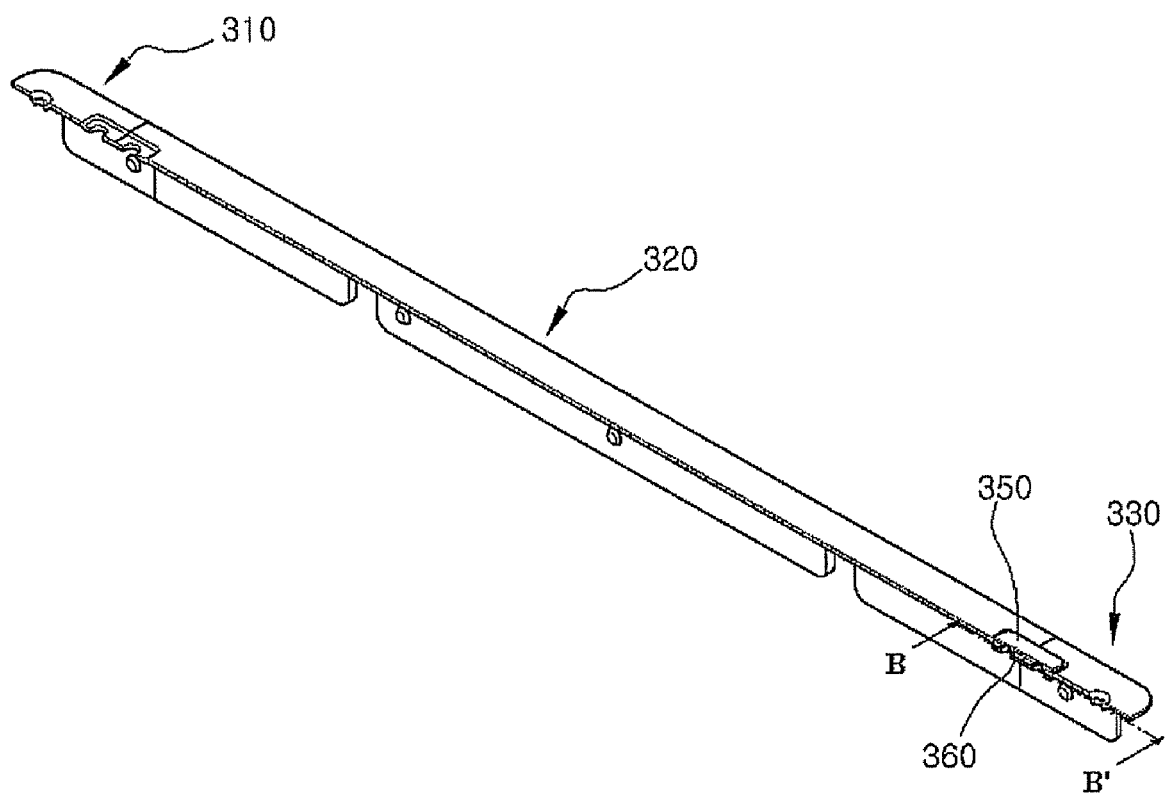
FIG. 6A is an elevated front perspective view showing a first exemplary embodiment of an assembled state of the separation type chassis according to the present invention.
Figure 6B:
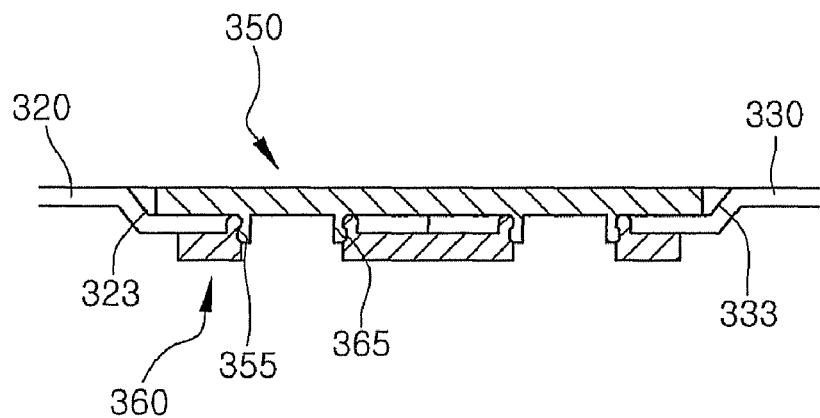
FIG. 6B is a cross-sectional view of the first exemplary embodiment of an assembled state of the separation type chassis taken along line B-B' of FIG. 6A.

FIG. 6A is an elevated front perspective view showing a first exemplary embodiment of an assembled state of the separation type chassis according to the present invention. FIG. 6B is a cross-sectional view of the first exemplary embodiment of an assembled state of the separation type chassis taken along line B-B' of FIG. 6A. FIG. 6A shows a partially assembled configuration of the separation type chassis wherein the third chassis member 330 is coupled to one end of the second chassis member 320 by means of the fastening member, and the first chassis member 310 is aligned on the opposite end of the second chassis member 320 awaiting the insertion of a fastening member. FIG. 6B is a cross-sectional view taken along line B-B' in FIG. 6A.

Referring to FIG. 6B, the second and third chassis members 320 and 330 are disposed such that corresponding ends thereof are in contact with each other, the first fastening member 350 is disposed in the guide recesses 323 and 333 of the second and third chassis members 320 and 330. The protrusions 355 of the first fastening member are inserted into the coupling holes formed in the second and third chassis members 320 and 330. The second fastening member 360 is disposed on rear surfaces of the guide recesses 323 and 333, and the holes 365 of the second fastening member 360 are coupled to the protrusions 355 of the first fastening member protruding through the coupling holes, so that the second and third chassis members 320 and 330 are coupled to each other by means of the first and second fastening members 350 and 360. At this time, since the entrance portions of the holes 365 of the second fastening member 360 are engaged with the stepped portions of the protrusions 355, the second and third chassis members which have been coupled to each other cannot be easily separated from each other.

Figure 7A:
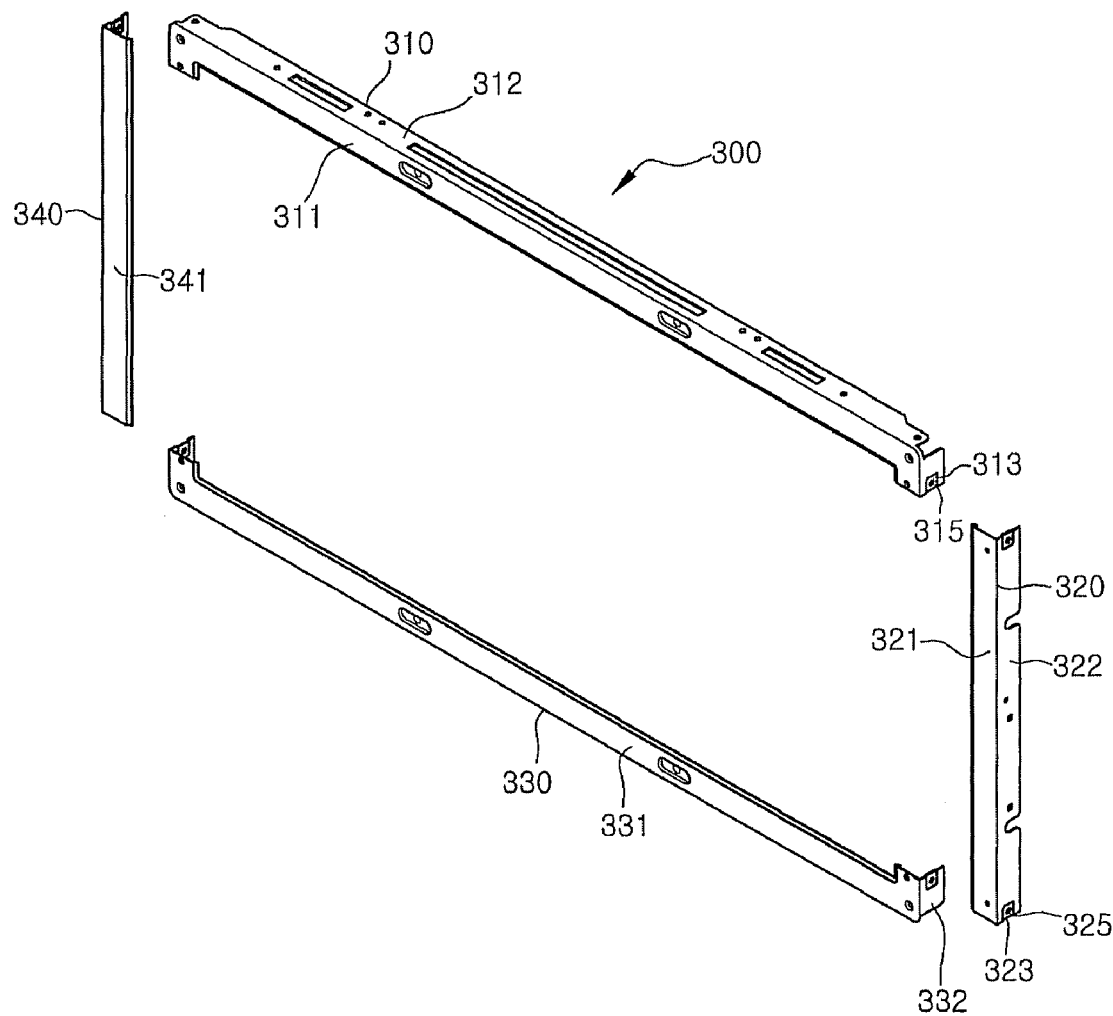
FIGS. 7A and 7B are an exploded perspective view and a partially enlarged view of a second exemplary embodiment of a separation type chassis according to the present invention, respectively.
Figure 7B:
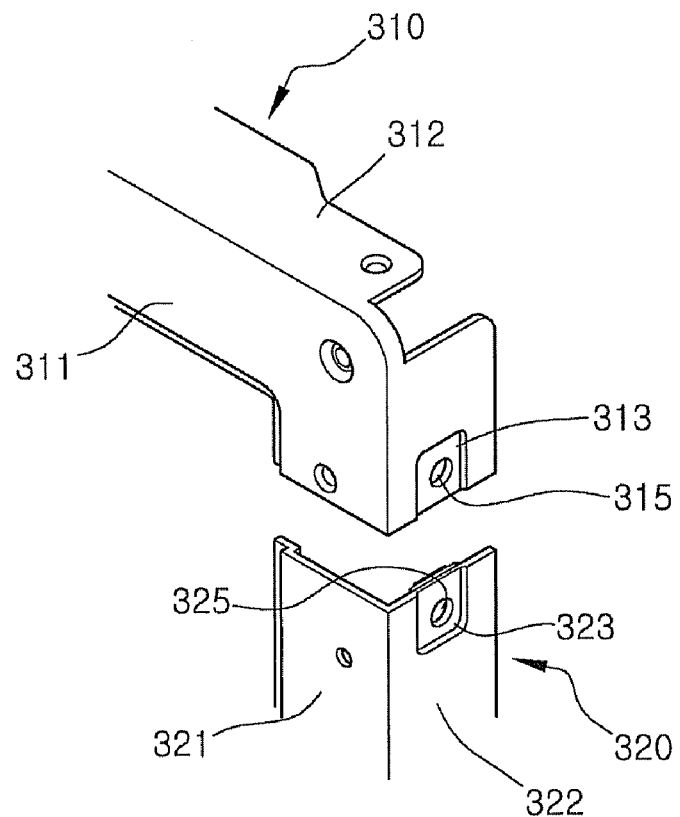
Figure 7C:
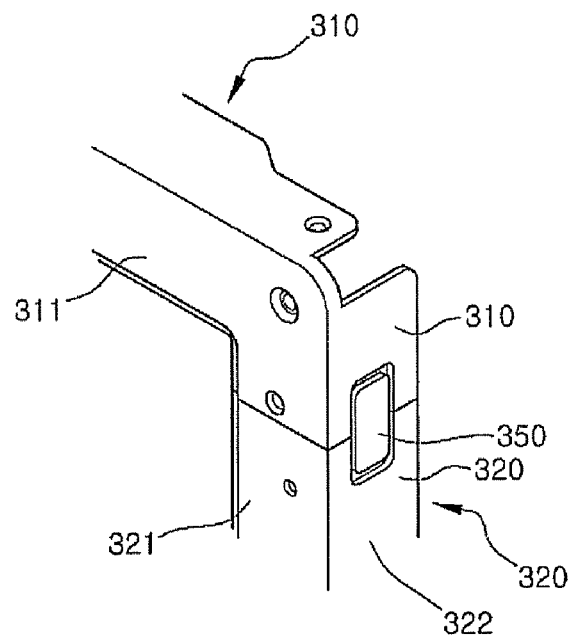
FIGS. 7C and 7D are partially enlarged views showing an assembled state of the second exemplary embodiment of a separation type chassis.
Figure 7D:
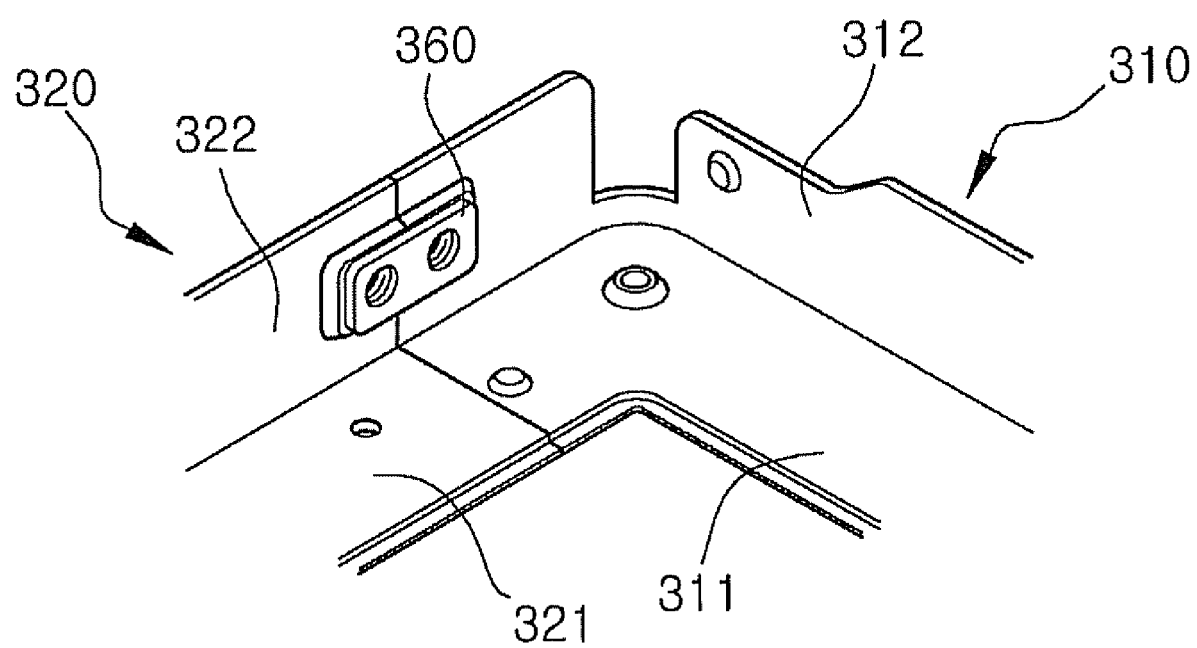

FIGS. 7A and 7B are an exploded perspective view and a partially enlarged view of a second exemplary embodiment of a separation type chassis according to the present invention, respectively; and FIGS. 7C and 7D are partially enlarged views showing an assembled state of the second exemplary embodiment of a separation type chassis. In the separation type chassis according to the second exemplary embodiment shown in FIGS. 7A to 7D, the positions of coupling holes and fastening members are different from those of the first exemplary embodiment of a separation type chassis. The remaining structure of the second exemplary embodiment of a separation type chassis is similar to that of the first exemplary embodiment of a separation type chassis. For clarity, the same reference numerals will refer to similar elements throughout the description of different exemplary embodiments. The differences in the structures will be described below.

Referring to FIGS. 7A and 7B, chassis members include a first chassis member 310, a second chassis member 320, a third chassis member 330 and a fourth chassis member 340, each of which is formed to have a major longitudinal axis and a smaller lateral axis. At this time, each of the chassis members comprises a base surface and a sidewall extending substantially vertically from the base surface, so that the chassis member has an "L"-shaped cross-section. Further, the first and third chassis members 310 and 330 have a longer longitudinal axis than that of the second and fourth chassis members 320 and 340. The first chassis member 310 comprises a first base surface 311 and a first sidewall 312 extending substantially vertically from the first base surface 311. The second, third and fourth chassis members 320, 330 and 340 comprise second, third and fourth base surfaces 321, 331 and 341; and second, third and fourth sidewalls 322, 332 and 342 extending substantially vertically from the second to fourth base surfaces, respectively.

Moreover, the sidewalls at opposing ends of each chassis member are formed with guide recesses having a predetermined shape to guide the positions of fastening members, and coupling holes having a predetermined shape are formed in the guide recesses. More specifically, the guide recesses 313 having a predetermined shape are formed at opposing ends of the fist sidewall 312 of the first chassis member 310, and the coupling holes 315 having a predetermined shape are formed in floor surfaces of the guide recesses 313. Further, guide recesses 323, 333 and 343 having a predetermined shape are formed at opposing ends of the second, third and fourth sidewalls 322, 332 and 342 of the second to fourth chassis members 320, 330 and 340, respectively, and the coupling holes 325, 335 and 345 having a predetermined shape are formed in floor surfaces of the guide recesses 323, 333 and 343, respectively. Alternative exemplary embodiments include configurations where coupling holes may be formed in a sidewall of a chassis member without forming the guide recesses.

FIGS. 7C and 7D are a partially enlarged top perspective view and a partially enlarged bottom perspective view showing a state where an end of the first chassis member 310 is coupled to an end of the second chassis member 320 by means of a fastening member, respectively.

The coupling structure of the second exemplary embodiment of a separation type chassis will be described with reference to FIGS. 7C and 7D. The corresponding ends of the first and second chassis members 310 and 320 are disposed to be in contact with each other. A first fastening member 350 having protrusions with a predetermined shape is inserted into the coupling hole 315 of the first chassis member 310 and the coupling hole 325 of the second chassis member 320, wherein the coupling holes are disposed on outer surfaces of the sidewalls of the first and second chassis members 310 and 320. Thereafter, a second fastening member 360 having fixing means for fixing the first fastening member 350 to the first and second chassis members is disposed on inner surfaces of the sidewall of the first and second chassis members. Then, the protrusions of the first fastening member 350 are coupled to the holes of the second fastening member 360, thereby coupling the first and second fastening members 350 and 360 to each other and also thereby fastening the first and second chassis members 310 and 320 to each other. The remaining chassis members are coupled to one another in a similar manner, thereby forming a chassis in the form of a rectangular frame.

Alternative exemplary embodiments include the configuration where the guide recesses may be formed in both the sidewall and the base surface of each of the chassis members.

Figure 8A:
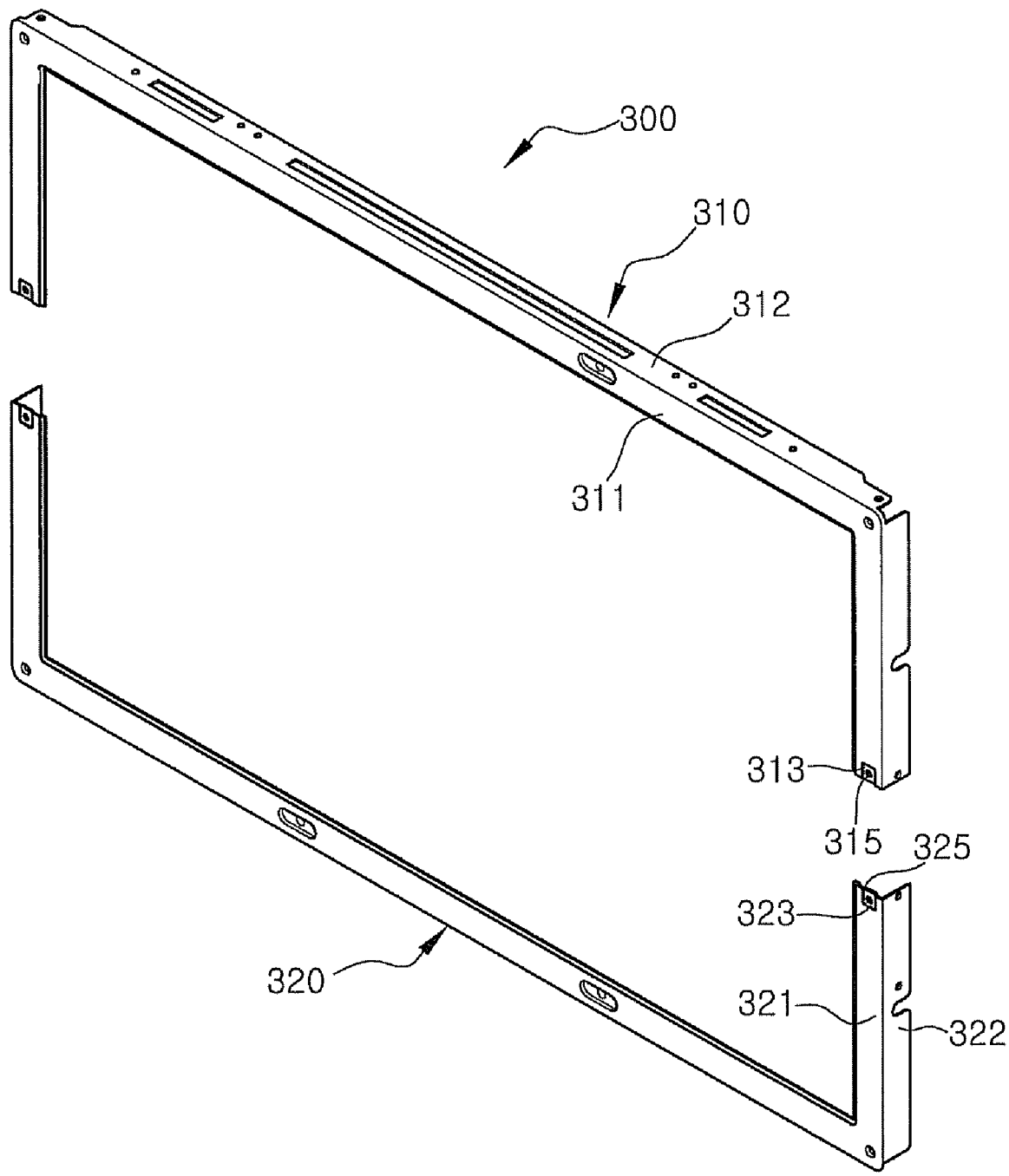
FIGS. 8A and 8B are an exploded perspective view of a third exemplary embodiment of a separation type chassis, and a partially enlarged view showing an assembled state of the third exemplary embodiment of a separation type chassis according to the present invention, respectively.
Figure 8B:
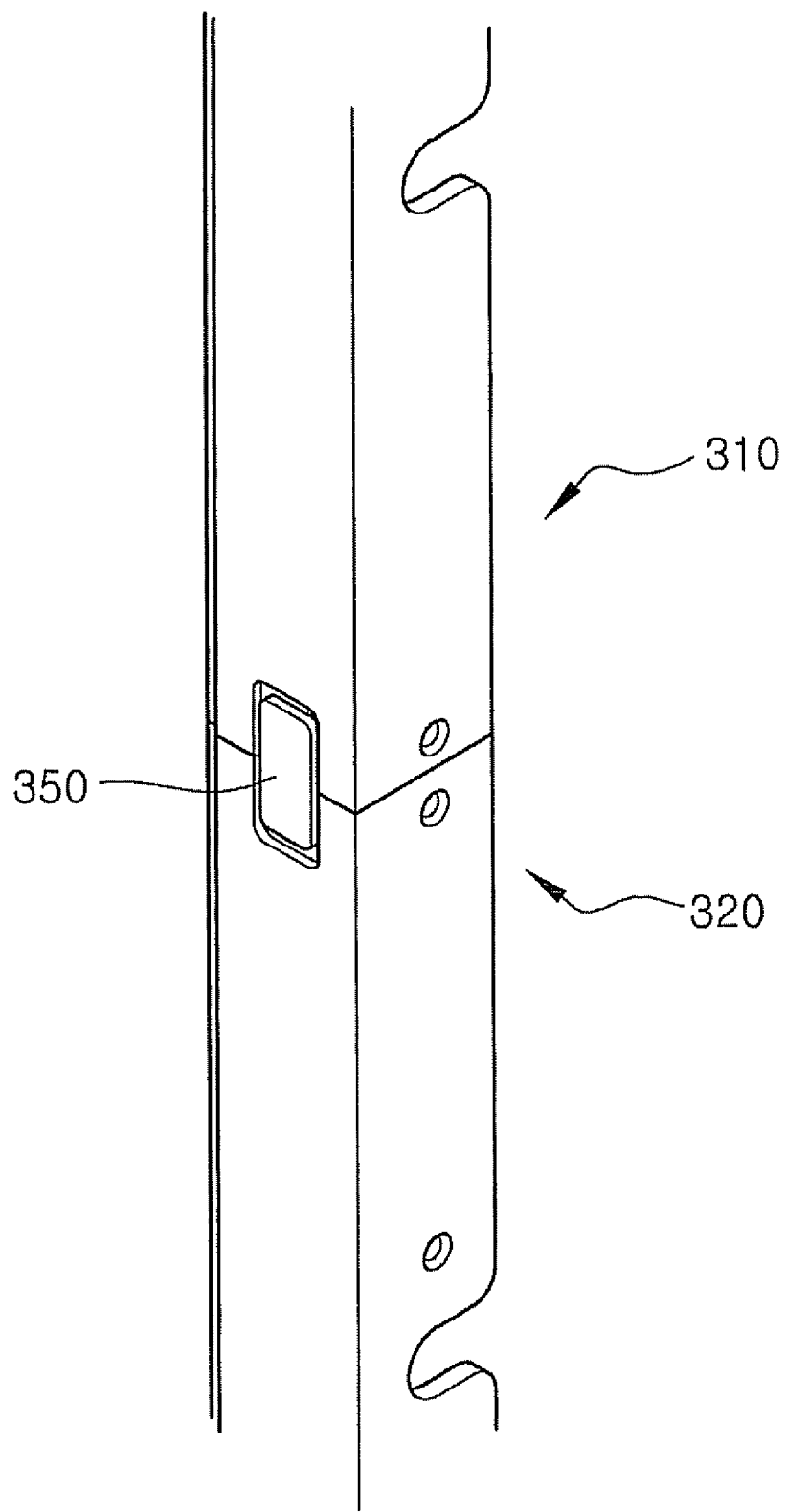
Figure 8C:
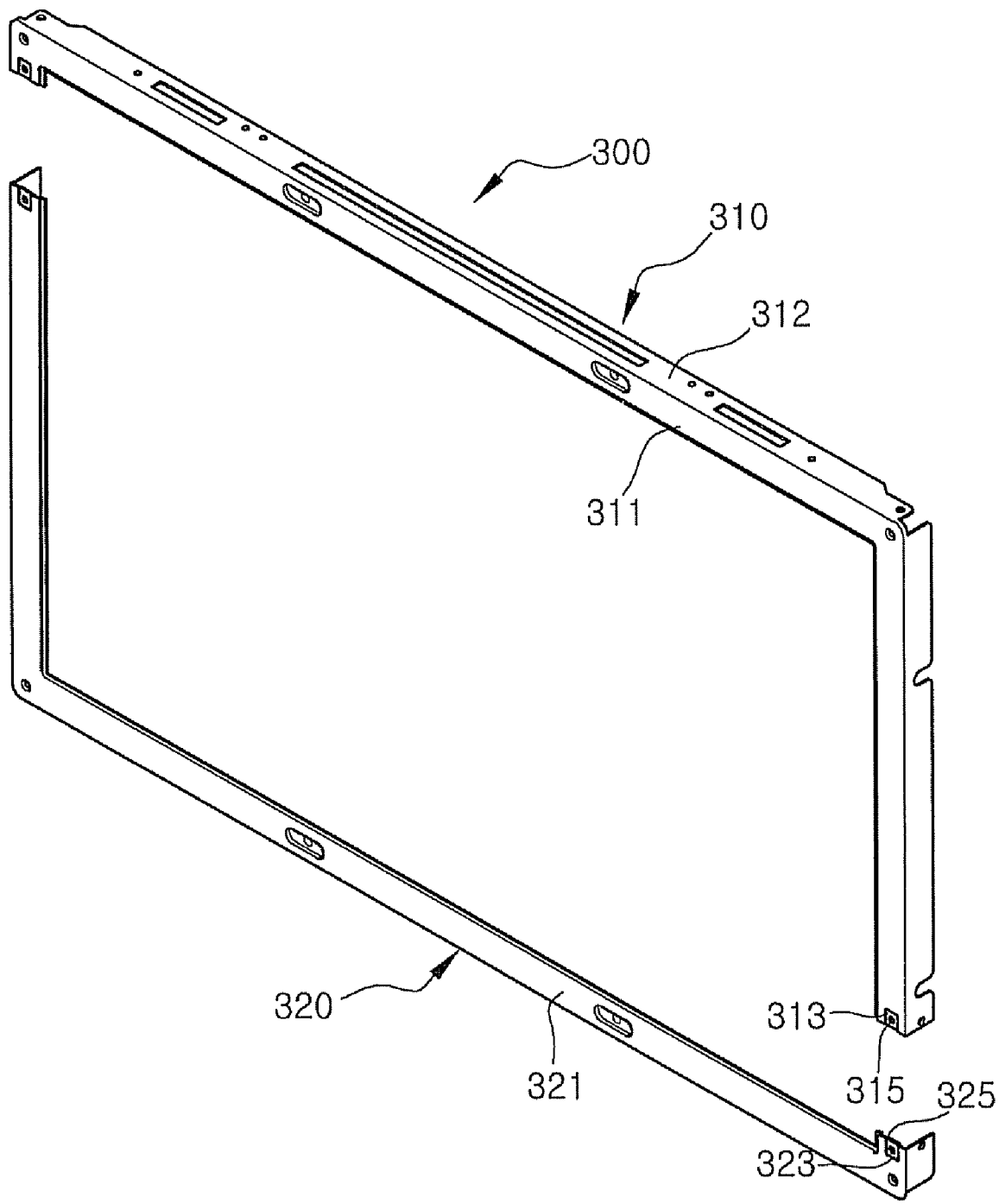
FIGS. 8C and 8D are an exploded perspective view of a fourth exemplary embodiment of a separation type chassis, and a partially enlarged view showing an assembled state of the fourth exemplary embodiment of a separation type chassis according to the present invention, respectively.
Figure 8D:
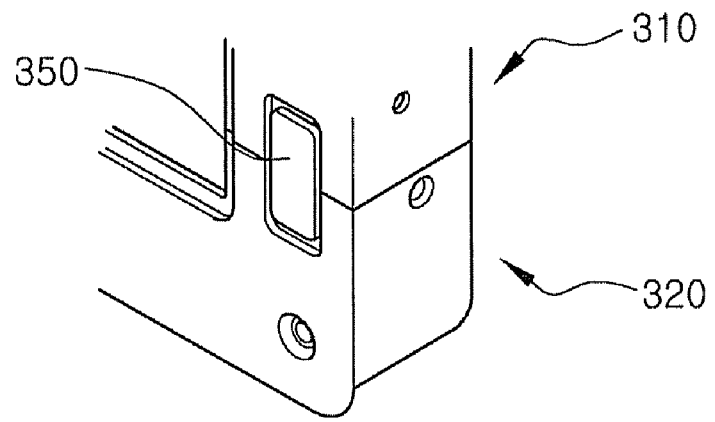

FIGS. 8A and 8B are an exploded perspective view of a third exemplary embodiment of a separation type chassis, and a partially enlarged view showing an assembled state of the third exemplary embodiment of a separation type chassis according to the present invention, respectively; and FIGS. 8C and 8D are an exploded perspective view of a fourth exemplary embodiment of a separation type chassis, and a partially enlarged view showing an assembled state of the fourth exemplary embodiment of a separation type chassis, respectively.

The third exemplary embodiment of a separation type chassis shown in FIGS. 8A and 8B and the fourth exemplary embodiment of a separation type chassis shown in FIGS. 8C and 8D differ from the first exemplary embodiment of a separation type chassis in view of the number and shape of the chassis members. The remaining structure of the third and fourth exemplary embodiments of a separation type chassis is similar to that of the first exemplary embodiment of a separation type chassis. Therefore, the differences between the structures will mainly be described below.

Referring to FIGS. 8A and 8B, the third exemplary embodiment of a separation type chassis comprises chassis members including first and second chassis members 310 and 320, and fastening members including first and second fastening members 350 and 360 (the second fastening member 360 is not shown).

The chassis members include the first and second chassis members 310 and 320 each of which is generally "U"-shaped. Each of the chassis members comprises a base surface and a sidewall extending substantially vertically from the base surface, so that the chassis member has an "L"-shaped cross-section. The first chassis member 310 comprises a first base surface 311 and a first sidewall 312 extending substantially vertically from the first base surface 311, and the second chassis member 320 comprises a second base surface 321 and a second sidewall 322 extending substantially vertically from the second base surface 321. In the current exemplary embodiment the first and second chassis members 310 and 320 have substantially the same length.

Moreover, both ends of each chassis member are formed with guide recesses having a predetermined shape to guide the positions of fastening members, and coupling holes having a predetermined shape are formed in the guide recesses. Guide recesses 313 having a predetermined shape are formed at each end of the first chassis member 310, and coupling holes 315 having a predetermined shape are formed in floor surfaces of the guide recesses 313. Further, guide recesses 323 having a predetermined shape are formed at each end of the second chassis member 320, and coupling holes 325 having a predetermined shape are formed in floor surfaces of the guide recesses 323.

Corresponding ends of the first and second chassis members 310 and 320 are disposed to be in contact with each other and the first fastening member 350 is disposed in the guide recesses 313 and 323 of the first and second chassis members 310 and 320. At this time, protrusions 355 (not shown) of the first fastening member are inserted into the coupling holes formed in the first and second chassis members 310 and 320. The second fastening member 360 (not shown) is disposed on rear surfaces of the guide recesses 313 and 323, and holes 365

(not shown) of the second fastening member 360 are coupled to the protrusions 355 of the first fastening member 350 protruding through the coupling holes, so that the first and second chassis members 310 and 320 are coupled to each other by means of the first and second fastening members 350 and 360. The other ends of the first and second chassis members 310 and 320 are also coupled to each other in a similar manner to that described above.

The guide recesses 313 and 323 and the coupling holes 315 and 325 are formed in the base surfaces 311 and 321 of the first and second chassis members in this third exemplary embodiment. Alternative exemplary embodiments include configurations where the guide recesses and the coupling holes may be formed in the sidewalls. Additionally, in this third exemplary embodiment guide recesses for guiding the fastening members are formed. Alternative exemplary embodiments include configurations wherein the coupling holes may be formed without formation of the guide recesses.

Referring to FIGS. 8C and 8D, the fourth exemplary embodiment of a separation type chassis comprises chassis members including first and second chassis members 310 and 320, and fastening members including first and second fastening members 350 and 360. Each of the chassis members is generally "L"-shaped in addition to having an "L" shaped cross-section. The remaining structure is substantially similar to that of the chassis member according to the third exemplary embodiment.

Figure 9A:
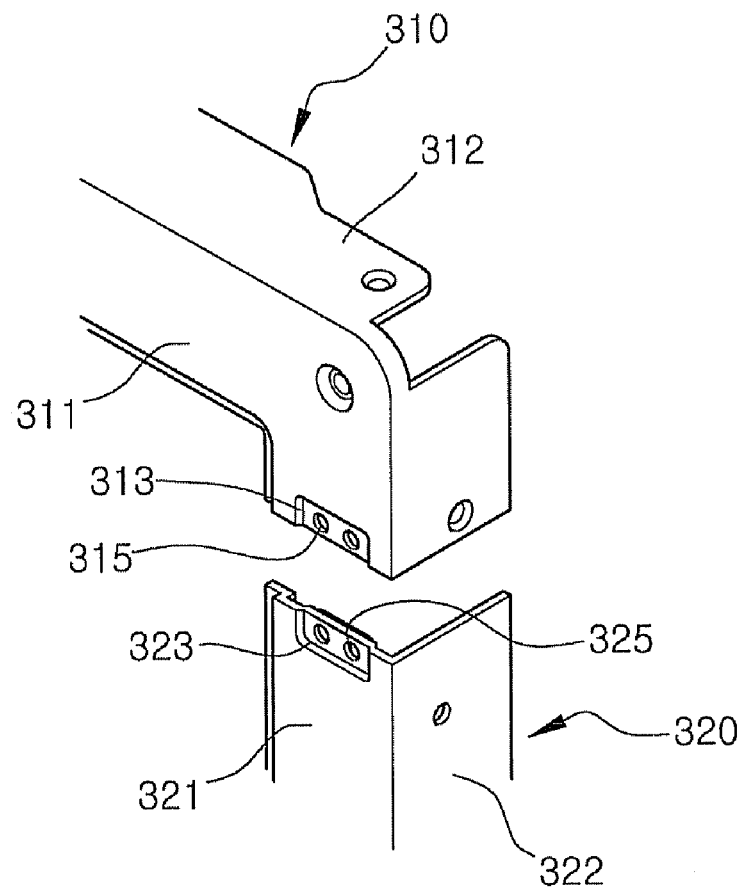
FIGS. 9A and 9B are an exploded perspective view of a fifth exemplary embodiment of a separation type chassis, and a view showing an assembled state of the fifth exemplary embodiment of a separation type chassis according to the present invention, respectively.
Figure 9B:
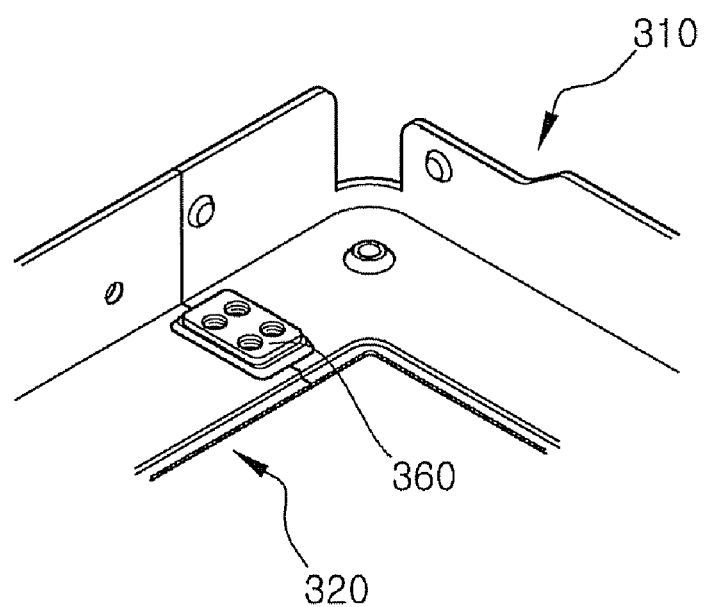
Figure 9C:
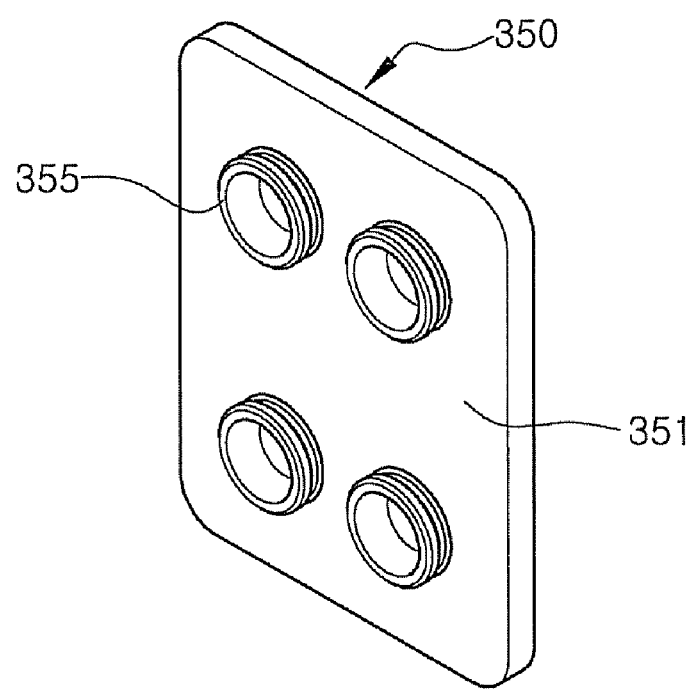
FIGS. 9C and 9D are elevated front perspective views of an exemplary embodiment of a first fastening member and an exemplary embodiment of a second fastening member of the fifth exemplary embodiment of a separation type chassis according to the present invention, respectively.
Figure 9D:
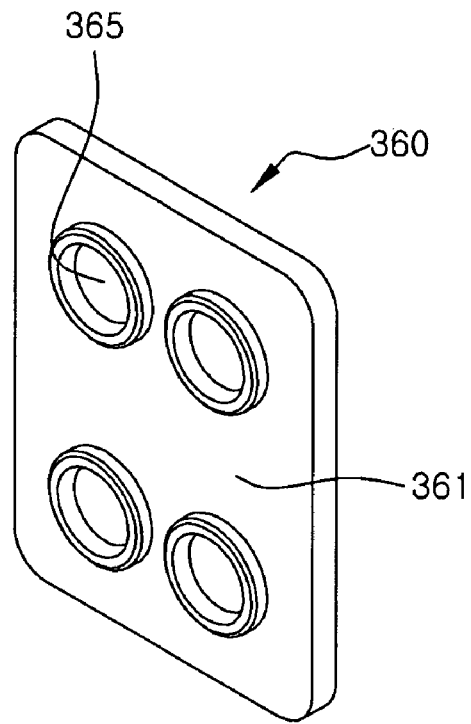

FIGS. 9A and 9B are an exploded perspective view of a fifth exemplary embodiment of a separation type chassis, and a view showing an assembled state of the fifth exemplary embodiment of a separation type chassis according to the present invention, respectively. FIGS. 9C and 9D are elevated front perspective views of an exemplary embodiment of a first fastening member and an exemplary embodiment of a second fastening member of the fifth exemplary embodiment of a separation type chassis according to the present invention, respectively. The fifth exemplary embodiment of a separation type chassis shown in FIGS. 9A to 9D is different from the first exemplary embodiment of a separation type chassis in view of the number of coupling holes on each chassis member, the number of protrusions on the first fastening member corresponding to the number of the coupling holes, and the number of holes on the second fastening member corresponding to the protrusions on the first fastening member. The remaining structure of the separation type chassis according to the fifth exemplary embodiment is similar to that of the first exemplary embodiment of a separation type chassis. The differences in structure will be described below.

Guide recesses 313 having a predetermined shape are formed at both ends of a first chassis member 310, and two coupling holes 315 having a predetermined shape are formed in a floor surface of each of the guide recesses 313. Similarly, guide recesses 323, 333 and 343 having a predetermined shape are formed at opposite ends of the second, third and fourth chassis members 320, 330 and 340, respectively, and two coupling holes 325, 335 or 345 having a predetermined shape are formed in a floor surface of each of the guide recesses 323, 333 and 343.

Four protrusions 355 corresponding to the number of the coupling holes are formed in the first fastening member 350, and four holes 365 corresponding to the numbers of the coupling holes and the protrusions 355 are formed in the second fastening member 360. This exemplary embodiment allows both chassis members to be fixed even more securely to each other.

Figure 10A:
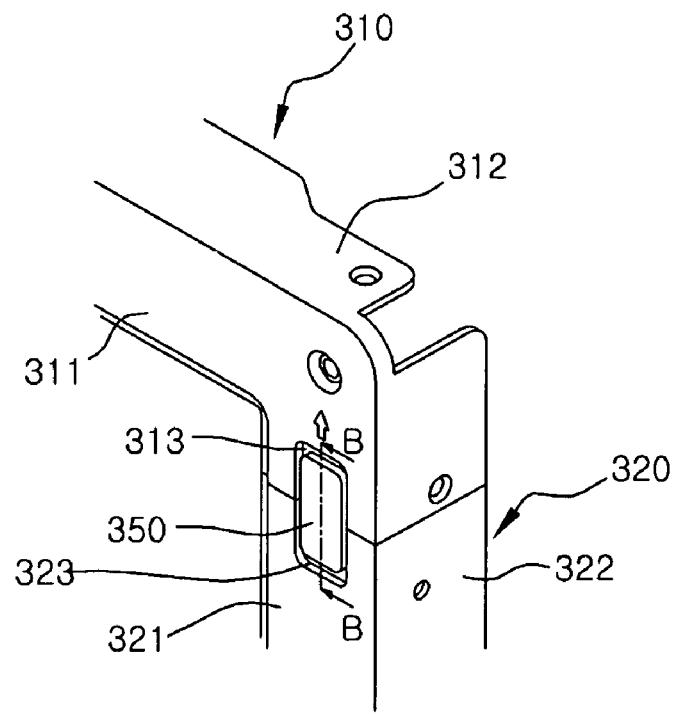
FIG. 10A is a partially enlarged perspective view showing an assembled state of a sixth exemplary embodiment of a separation type chassis according to the present invention.
Figure 10B:
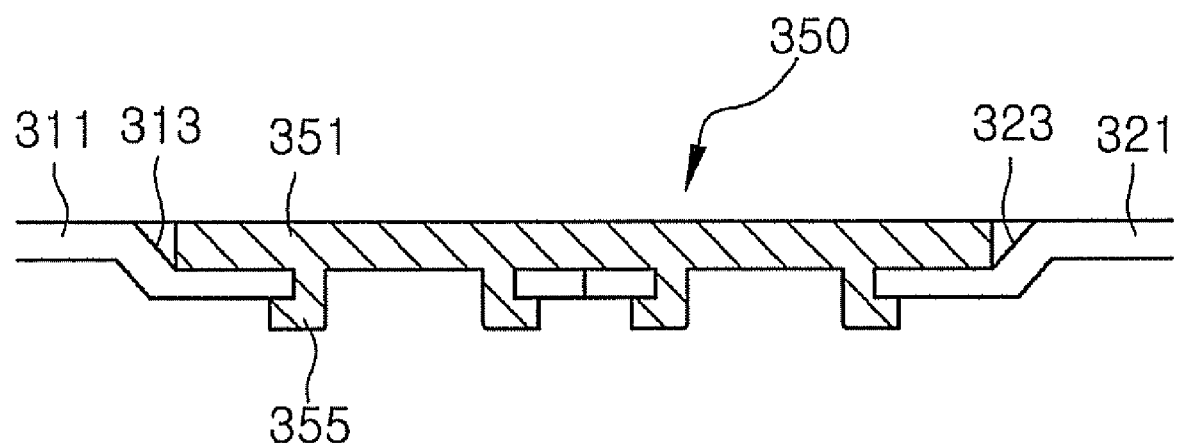
FIG. 10B is a cross-sectional view of the assembled state of a sixth exemplary embodiment of the separation type chassis taken along line B-B' of FIG. 10A.

FIG. 10A is a partially enlarged perspective view showing an assembled state of a sixth exemplary embodiment of a separation type chassis according to the present invention and FIG. 10B is a cross-sectional view of the assembled state of a sixth exemplary embodiment of an assembled state of the separation type chassis taken along line B-B' of FIG. 10A.

The sixth exemplary embodiment of a separation type chassis according to the present invention is different from the aforementioned exemplary embodiments in that corresponding ends of chassis members are coupled to each other by means of a single fastening member. The remaining structures thereof are similar to the previous exemplary embodiments.

FIG. 10A shows a state where an end of a second chassis member 320 is coupled to an end of the first chassis member 310 by a fastening member 350, and FIG. 10B is a cross-sectional view talen along line B-B' in FIG. 10A.

Referring to FIG. 10B, corresponding ends of the first and second chassis members 310 and 320 are disposed to be in contact with each other, the fastening member 350 is disposed in guide recesses 313 and 323 formed in base surfaces 311 and 321 of the first and second chassis members 310 and 320. Protrusions 355 of the fastening member 350 are inserted into coupling holes formed in the first and second chassis members 310 and 320. Here, a periphery portion of a tip of the protrusion 355 is formed to be larger than a body portion thereof so as to provide a stepped structure, and the diameter of the coupling hole is formed to correspond to the size of the body portion of the protrusion, thereby improving a fastening force between the fastener and the coupling hole. In the present exemplary embodiment the chassis members can be coupled to each other by the single fastening member.

Figure 11:
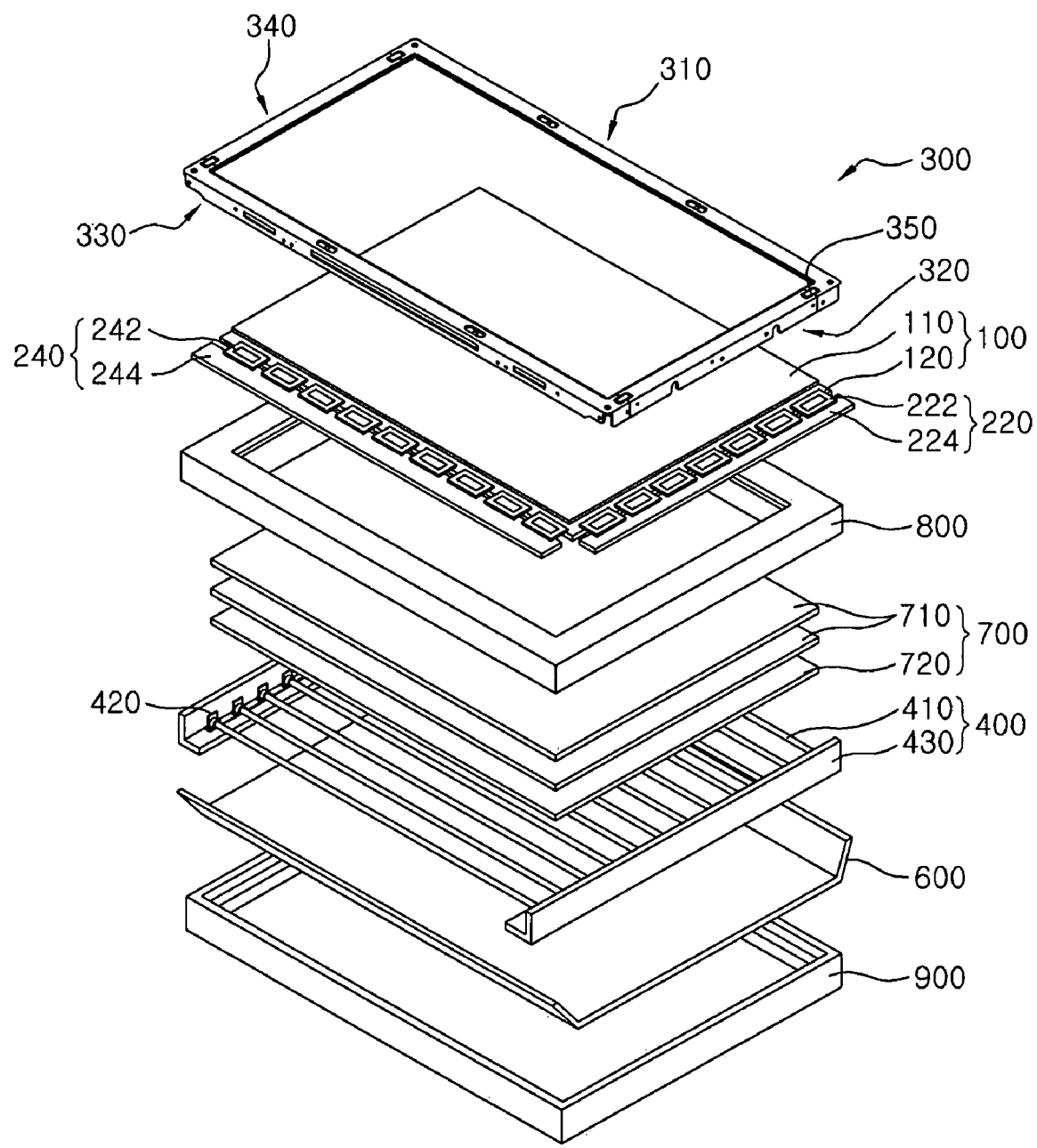
FIG. 11 is an exploded perspective view of an exemplary embodiment of a liquid crystal display having the separation type chassis according to the present invention.

FIG. 11 is an exploded perspective view of an exemplary embodiment of a liquid crystal display having the separation type chassis according to the present invention.

Referring to FIG. 11, the liquid crystal display includes a direct type backlight assembly. Direct type backlight assemblies are typically applied to a large-sized information display device. The liquid crystal display comprises a separation type chassis 300 of the present invention, a liquid crystal display panel 100 comprising a thin protective film 110 and a thin film transistor ("TFT") substrate 120, driving circuit units 220 and 240, a mold frame 800, a plurality of optical sheets 710, a diffusion plate 720, a lamp unit 400, a reflection plate 600 and a lower chassis 900.

The driving circuit units 220 and 240 comprise a gate-side printed circuit board 224 connected to the liquid crystal display panel 100 and having a control integrated circuit ("IC") mounted thereon to apply a gate signal to a gate line of a TFT substrate 120; a data-side printed circuit board 244 having a control IC mounted thereon to apply a data signal to a data line of the TFT substrate 120; a gate-side flexible printed circuit board 222 having an exposed ground pattern and making a connection between the TFT substrate 120 and the gate-side printed circuit board 224; and a data-side flexible printed circuit board 242 having an exposed ground pattern and making a connection between the TFT substrate 120 and the data-side printed circuit board 244.

The gate-side printed circuit board 224 and the data-side printed circuit board 244 are connected respectively to the gate-side flexible printed circuit board 222 and the data-side flexible printed circuit board 242 to apply a gate driving signal and an external image signal. Alternative exemplary embodiments include configurations where the gate-side printed circuit board 224 and the data-side printed circuit board 244 may be integrated into a single printed circuit board.

Further, driving ICs (not shown) are mounted on the flexible printed circuit boards 222 and 242 to transmit red (R), green (G) and blue (B) signals and digital power, which are generated from the flexible printed circuit boards 224 and 244, to the liquid crystal panel 100. The current exemplary embodiment uses a tape-automated bonding ("TAB") method for IC positioning. Alternative exemplary embodiments include configurations utilizing a chip on glass ("COG") method for mounting the driving ICs on the TFT substrate rather than the flexible printed circuit boards 222 and 242.

The separation type chassis 300 is formed to take the shape of a rectangular frame having a flat portion and a sidewall portion bent substantially perpendicularly thereto, so that the liquid crystal display panel 100 and the driving circuit units 220 and 240 can be prevented from being separated and can also be protected against an applied external impact.

A light guide 700 comprising a plurality of optical sheets 710 and the diffusion plate 720, at least one lamp unit 400, and the reflection plate 600 are stacked sequentially on the bottom of a receiving space formed below the mold frame 800, and the lower chassis 900 is coupled to the mold frame 800 and supports the aforementioned components.

In the current exemplary embodiment the lamp unit 400 comprises a plurality of rod-shaped lamps 410 disposed in parallel, a plurality of lamp-fixing units 420 for fixing the lamps, and a lamp support 430 for receiving the plurality of lamp fixing units 420 therein. Alternative exemplary embodiments may use a greater or lesser number of lamps, a different shape of lamp, or a different type of light source altogether such as light emitting diodes ("LEDs"). In one exemplary embodiment cold cathode fluorescent lamps ("CCFLs") are mainly used as the plurality of lamps 410. In the exemplary embodiment utilizing CCFLs each of the lamps 410 comprises a glass tube, inert gas contained in the glass tube, and an anode and a cathode provided at both ends of the glass tube. The diffusion plate 720 guides light emitted from the plurality of lamps toward a front side of the liquid crystal panel 100, and then diffuses the light to establish uniform distribution in a wide range so that the light can be evenly irradiated on the liquid crystal panel 100. The optical sheets 710 convert light, which is incident at a certain angle on the optical sheets 710, to planar light emitting vertically from the plurality of optical sheets 710.

According to the present invention described above, chassis members are coupled to one another by means of fastening members rather than a pressing method using a press. Thus, there is an advantage in that production costs can be reduced and convenience of assembly can be improved.

In addition, the present invention can be applied even to a chassis with a small width and has an advantage in that storage and transportation efficiency can be enhanced.

The separation chassis and the flat panel display having the same according to the present invention described above are merely illustrative exemplary embodiments. The present invention is not limited to the abovementioned exemplary embodiments. The scope of the present invention is defined by the appended claims. It will be understood that those skilled in the art can make various changes and modifications thereto without departing from the scope of the present invention.

What is claimed is:

1. A separation type chassis for a flat panel display, comprising:
    at least two chassis members each comprising a base surface and a sidewall extending substantially vertically from the base surface; and
    a plurality of single unitary indivisible fastening members coupling the chassis members,
    wherein coupling holes having a predetermined shape are formed at opposing ends of each of the chassis members,
    wherein each of the fastening members contacts one of the base surface and the sidewall of each of adjacent chassis members, and is coupled with the coupling holes of the adjacent chassis members, the base surfaces and the sidewalls of the adjacent chassis members coupled to each other being coplanar,
    wherein each of the single unitary indivisible fastening members includes a plurality of a protrusion each extended from a base plate, the protrusions being inserted into and fastened to the coupling holes of the adjacent chassis members, and an end of the protrusion distal from the base plate has a size larger than that of a body portion thereof, and
    wherein a length of the body portion of the fastening member is substantially the same as a depth of the coupling hole in the each of the chassis members.

2. The separation type chassis as claimed in claim 1, wherein the coupling holes are formed in the sidewall of each of the chassis members.

3. The separation type chassis as claimed in claim 1, wherein the coupling holes are formed in the base surface and sidewall of each of the chassis members.

4. The separation type chassis as claimed in claim 1, wherein each of the chassis members is made of one of a metallic and plastic material.

5. The separation type chassis as claimed in claim 1, wherein the chassis members comprise first to fourth chassis members each of which is formed having a major longitudinal axis and a smaller lateral axis.

6. The separation type chassis as claimed in claim 1, wherein the chassis members comprise first and second "L-shaped" chassis members.

7. The separation type chassis as claimed in claim 1, wherein the chassis members comprise first and second "U-shaped" chassis members.

8. The separation type chassis as claimed in claim 1, wherein opposing ends of each of the chassis members are formed with guide recesses guiding the positioning of the fastening members, and the coupling holes are formed in the guide recesses.

9. The separation type chassis as claimed in claim 1, wherein the number of the protrusions on the fastening member is double the number of coupling holes formed on one end of the chassis members and the shape of the protrusions on the fastening member correspond to the shape of the coupling holes formed on one end of each of the chassis members.

10. The separation type chassis as claimed in claim 1, wherein the fastening members are one of a metallic and plastic material.

11. A flat panel display, comprising:
    a flat display panel;
    a mold frame having a predetermined receiving space receiving the flat display panel; and
    a separation type chassis partially covering a top surface of the flat display panel,
    wherein the separation type chassis comprises:
        at least two chassis members and a plurality of single unitary indivisible fastening members coupling the chassis members, each chassis member comprising a base surface and a sidewall extending substantially vertically from the base surface,
        coupling holes having a predetermined shape are formed at opposing ends of each of the chassis members, and
        each of the fastening members contacts one of the base surface and the sidewall of each of adjacent chassis members, and is coupled with the coupling holes of the adjacent chassis members, the base surfaces and the sidewalls of the adjacent chassis members coupled to each other being coplanar, wherein each of the single unitary indivisible fastening members includes a plurality of a protrusion each extended from a base plate, the protrusions being inserted into and fastened to the coupling holes of the adjacent chassis members, and an end of the protrusion distal from the base plate has a size larger than that of a body portion thereof, and wherein a length of the body portion of the fastening member is substantially the same as a depth of the coupling hole in the each of the chassis members.

* * * * *